March 18, 1930.    E. A. BANSCHBACH    1,751,025
FILING DEVICE
Original Filed Jan. 31, 1919    6 Sheets-Sheet 2
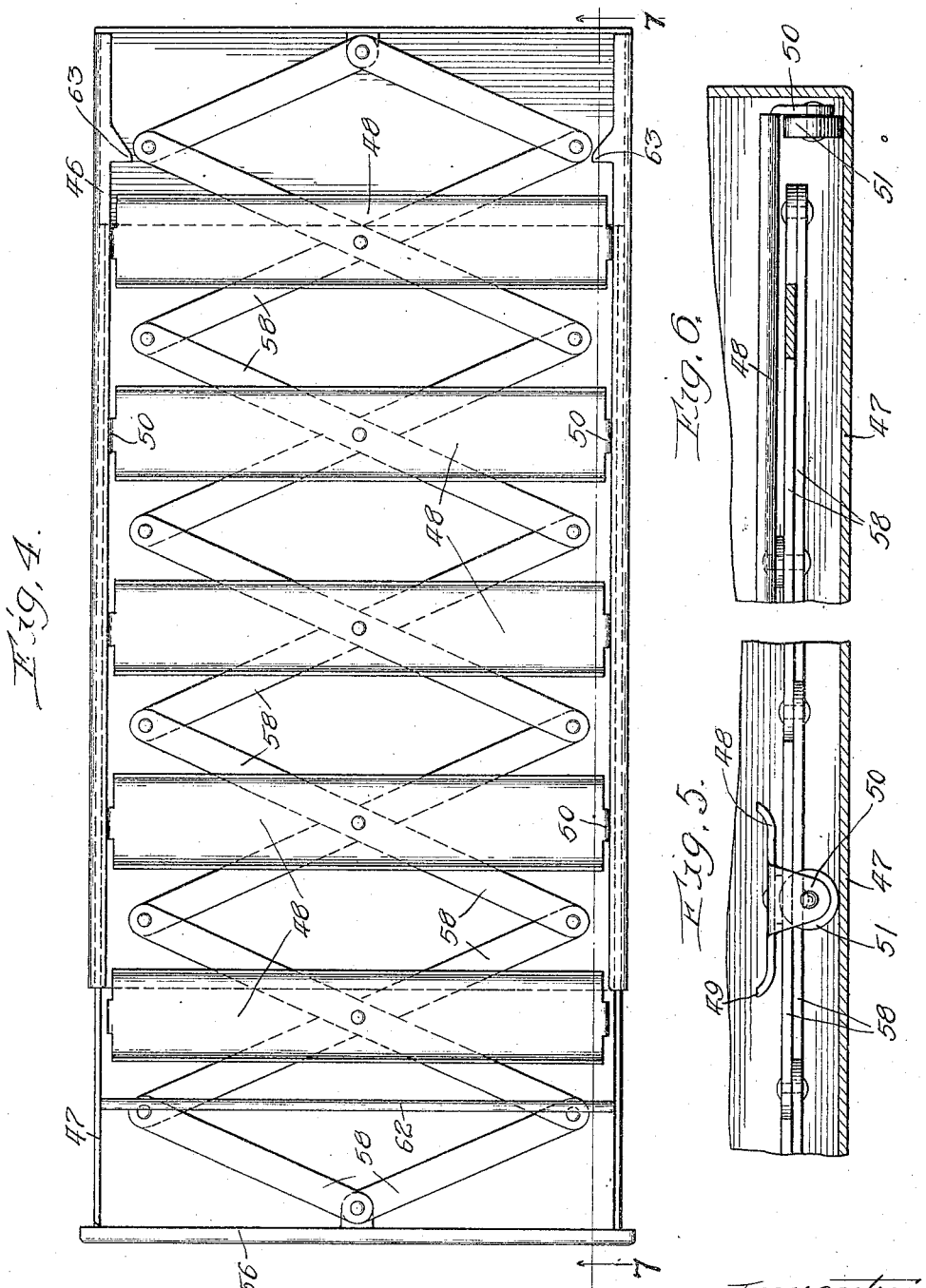

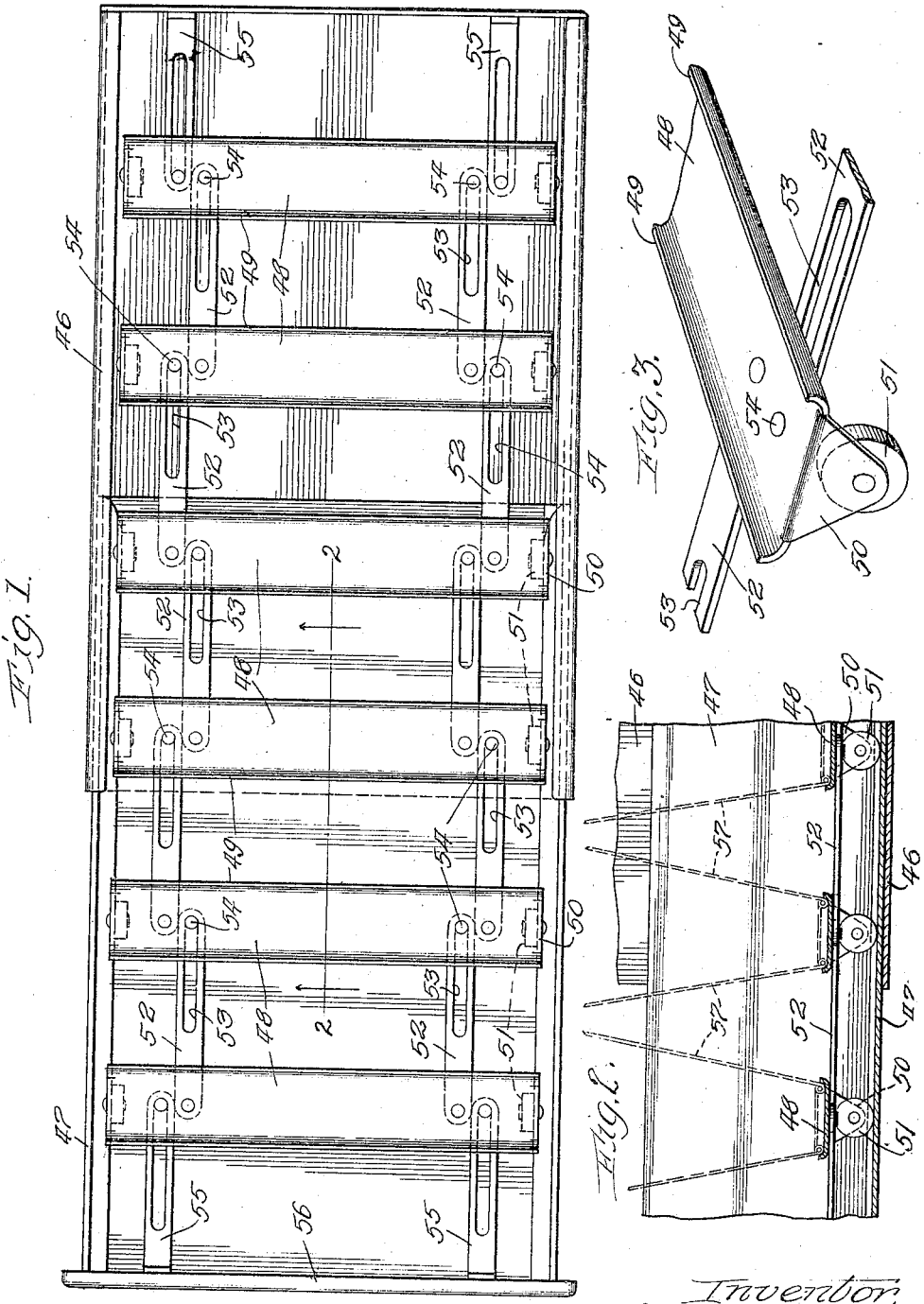

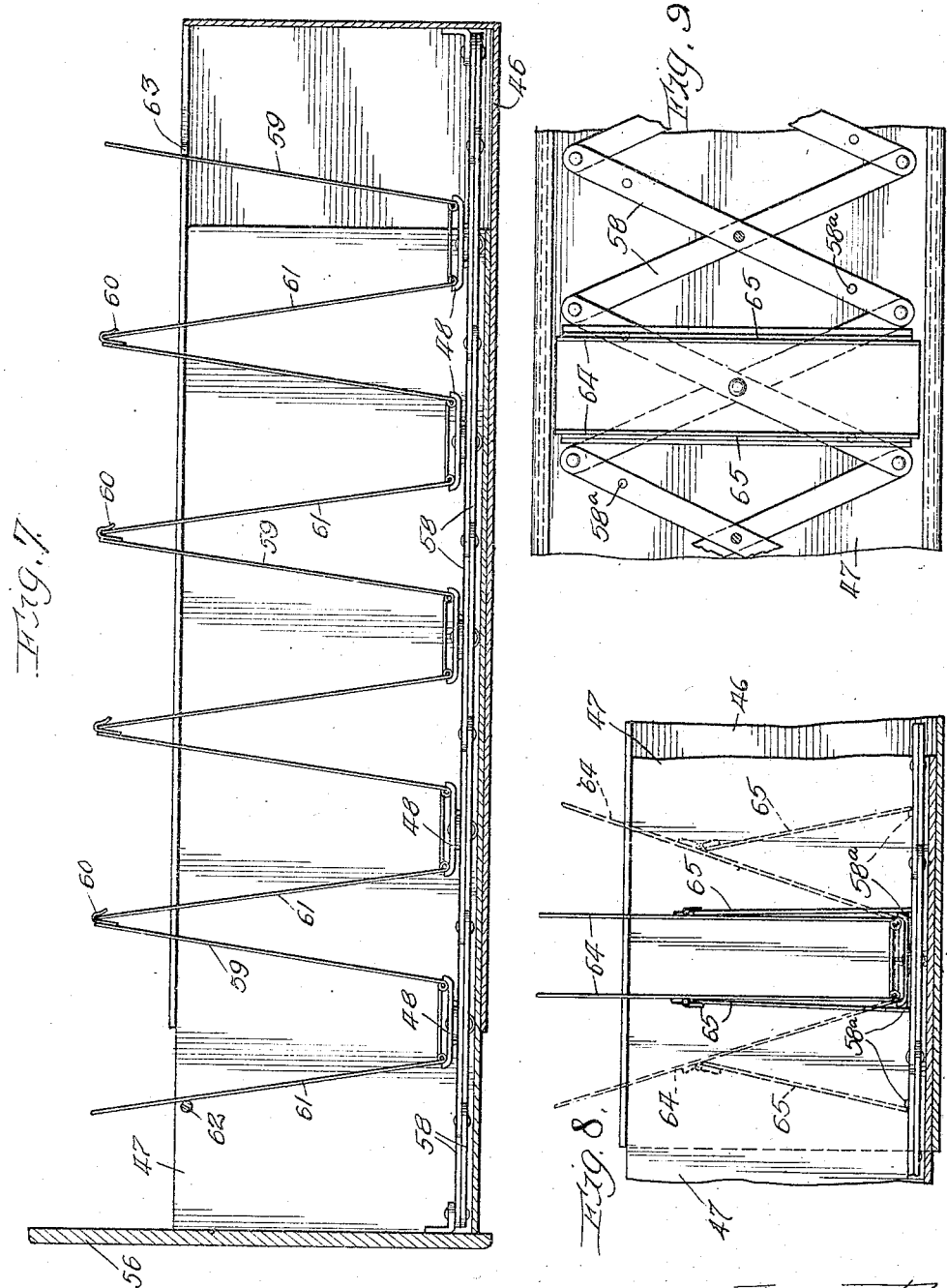

March 18, 1930. E. A. BANSCHBACH 1,751,025
FILING DEVICE
Original Filed Jan. 31, 1919 6 Sheets-Sheet 4
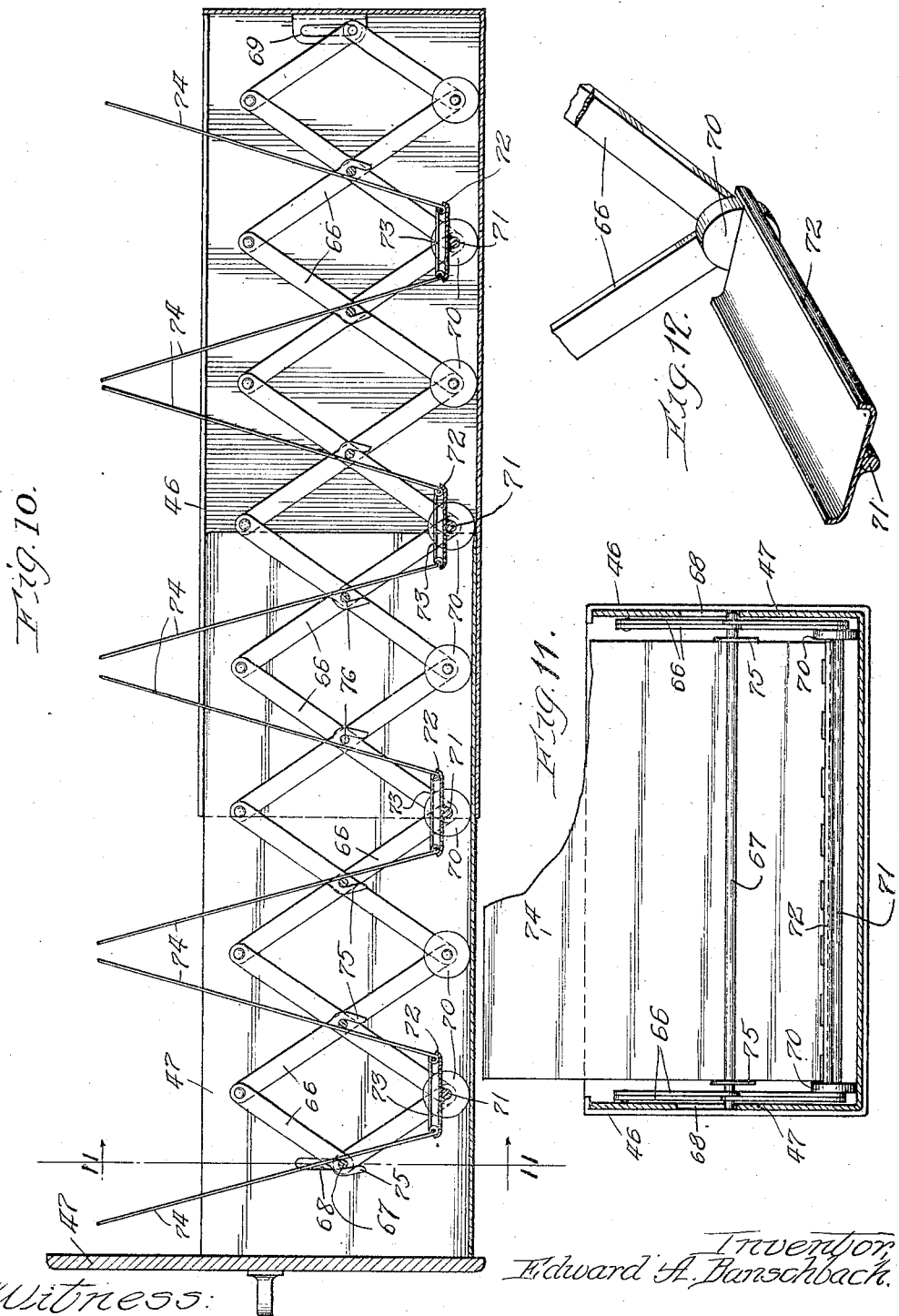

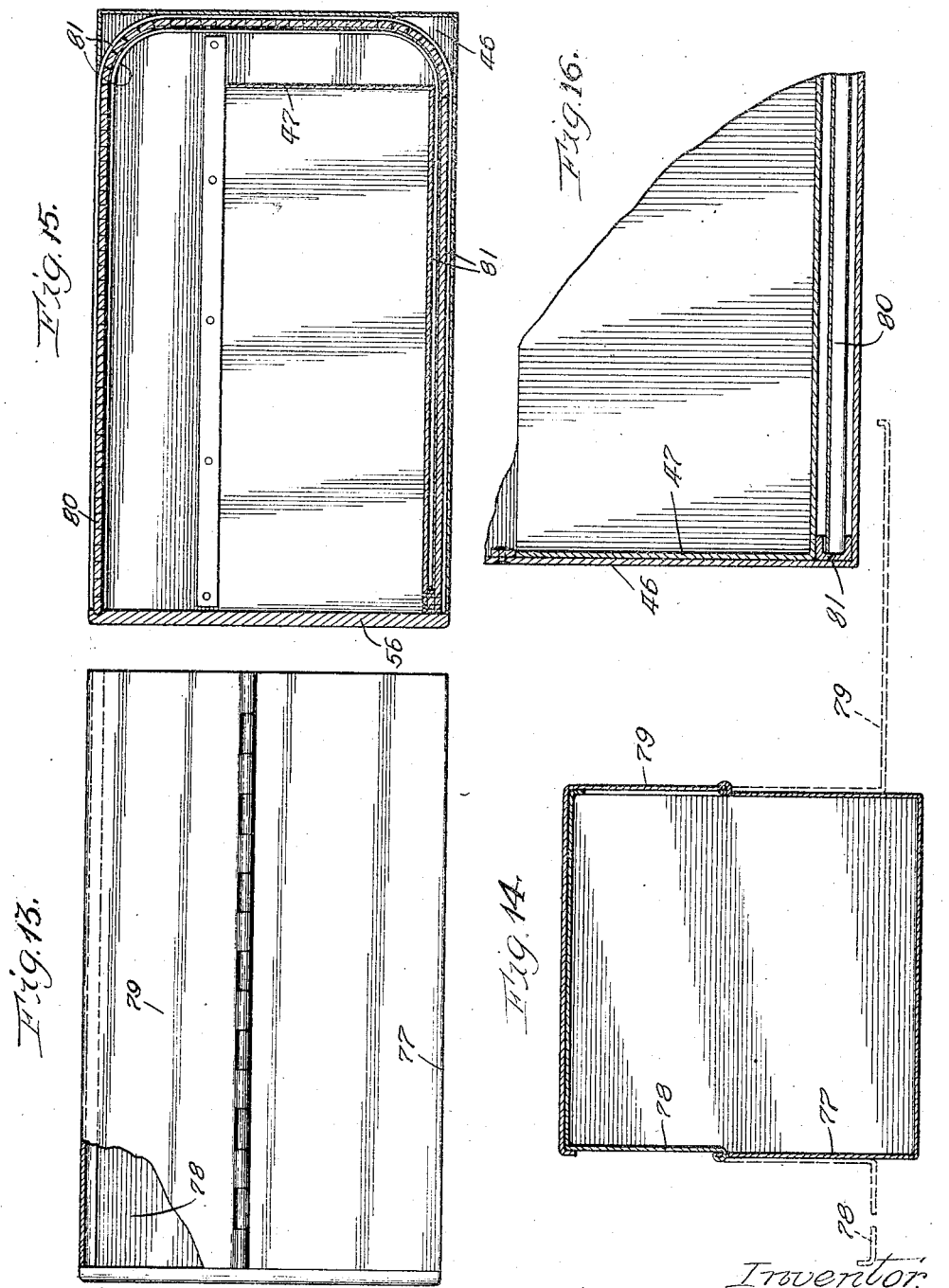

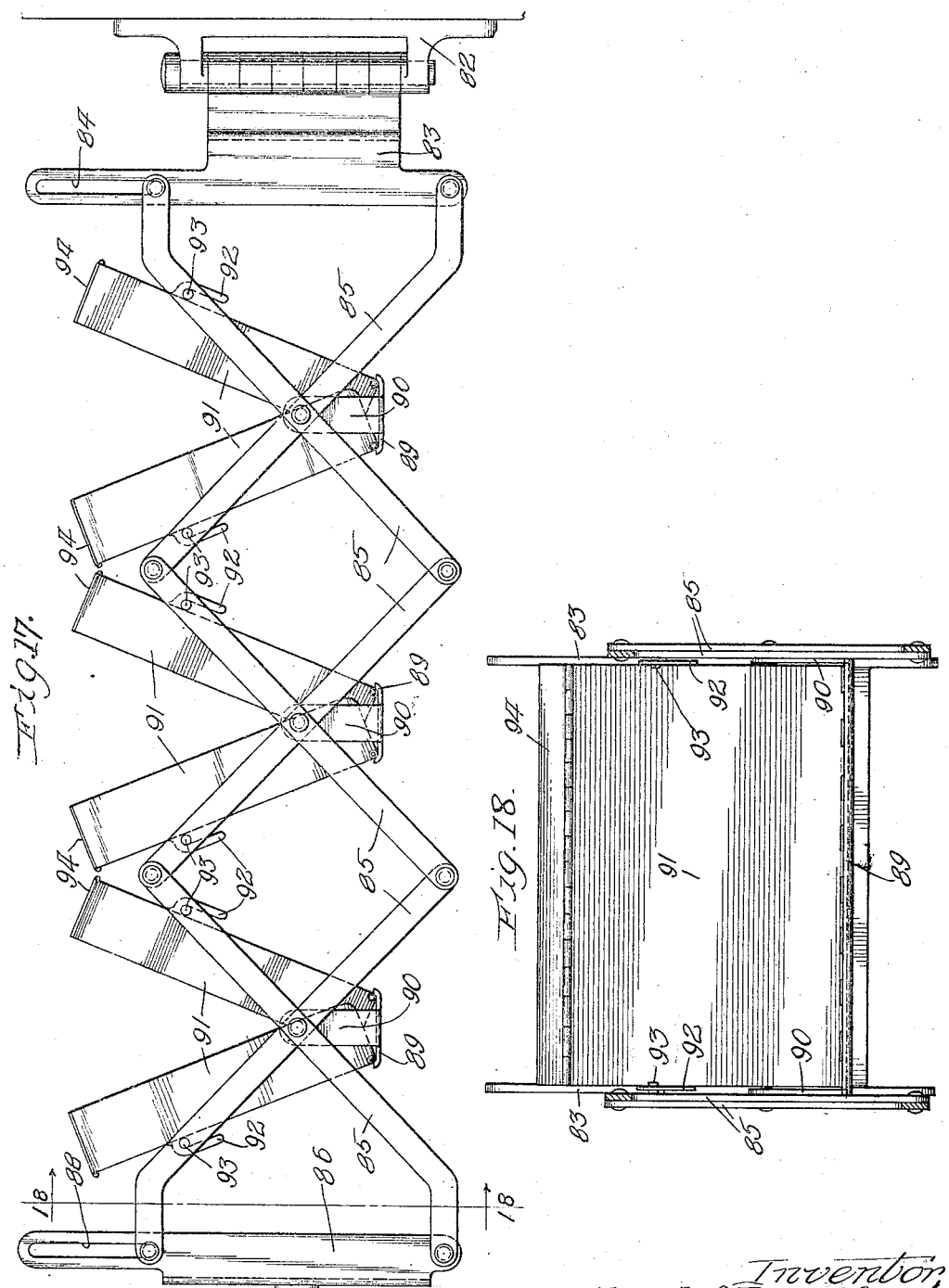

Patented Mar. 18, 1930

1,751,025

UNITED STATES PATENT OFFICE

EDWARD A. BANSCHBACH, OF CHICAGO, ILLINOIS

FILING DEVICE

Continuation of application Serial No. 274,323, filed January 31, 1919. This application filed November 7, 1921. Serial No. 513,360½.

This invention is a continuation of my application for filing devices, Serial No. 274,323 filed January 31st, 1919, and the principal object of the invention is to provide a plurality of spacing holders which can be separately or simultaneously extended or expanded so that the contents of any holder may be more freely accessible. The invention consists in the novel construction, combination and arrangement of the several parts.

In the accompanying drawings, Fig. 1 is a plan view of a container for a plurality of individual holders; Fig. 2 is a sectional view taken on the line 2—2 of Fig. 1; Fig. 3 is a perspective of one of the supporting parts of this container; Fig. 4 is a plan view of a container for individual holders having a lazy-tongs extensible means at the bottom; Figs. 5 and 6 show details of this construction; Fig. 7 is a section taken on the line 7—7 of Fig. 4; Fig. 8 illustrates means carried by the lazy-tongs for opening and closing the individual holders; Fig. 9 is a plan view showing a holder in closed position; Fig. 10 is a section of a modified form of container in which the extensible means is at the sides of the container; Fig. 11 is a section taken on the line 11—11 of Fig. 10; Fig. 12 is a perspective of a detail; Figs. 13 and 14 are views illustrating a container which has side opening lids which overlap when they are closed; Figs. 15 and 16 illustrate a container of the roll-top variety; Fig. 17 is a side view of an extensible holder having a swinging lazy-tongs action of the telephone stand type; and Fig. 18 is a section taken on the line 18—18 of Fig. 17.

In filing sheets, pamphlets, or the like, it is desirable that a plurality of separate holders be provided or that there are suitable independently adjustable spacing guides so that one holder or spacing guide, for example, may be adjustable relatively to the adjacent ones, to accommodate more or less material between them. At the same time the holders or spacers must be easily separable so that the space within or between them is freely accessible for the insertion or removal of other material.

In a container such as shown by Fig. 1 there is a fixed section or cabinet 46 and a slidable drawer 47 with a plurality of movable carriers 48 preferably formed with upturned edges 49 for seating any one of the individual holders. The ends 50 of each carrier 48 are turned downwardly to provide pivotal mounting for rollers 51 and attached to the bottom of each carrier are straps 52 with slots 53 therein for engaging pins 54 projecting from the next adjacent carrier. Correspondingly slotted straps 55 are attached to the front 56 of the drawer and to the rear of the cabinet 46 so that when the drawer is drawn outwardly the carriers 48 will be spaced apart a proper distance to allow the covers of the holders to be spaced apart to form dividers as indicated by broken outlines 57 in Fig. 2, so that any individual holder can be opened to permit access thereto or to remove it from the carrier which supports it.

A somewhat similar container is illustrated in Figs. 4 to 7 in which the carriers 48 are attached to a lazy-tongs apparatus 58 attached at one end to the front of the drawer 47 and attached at the rear end to the end of the cabinet. When the drawer is closed the holders supported by the carriers 48 will be pressed compactly together, but when the drawer is drawn outwardly the carriers will be spaced apart and will be opened, depending upon the amount that the drawer is pulled out.

As diagrammatically illustrated in Fig. 7, one of the sides 59 of a holder supported by one of the carriers 48 may be provided with a hook 60 for engaging the adjacent cover 61 of the holder next to it to form a spacing divider. This construction may be employed for opening the holders rather than the levers 58 as shown for operating the supporting means when the holders are placed upon a plain surface. In the construction just described, a cross-bar 62 may be provided at the front of the drawer 47, and a projection 63 at each side of the back of the cabinet 46 for limiting the opening of the end holder covers 61 and 59.

In the construction shown by Figs. 8 and 9, the holder 64 has hinged supports 65, the lower edges of which are engaged by studs 58ᵃ which project from the surface of the lazy-tongs. When the drawer 47 is pulled outwardly, these projections 58ª engaging under the lower edges of the hinged supports, as shown by the broken outline in Fig. 8, move the supports outwardly, allowing the sides of the holder to separate as shown, and when the drawer is pushed inwardly the sides of the holder engaging the adjacent holders closes all of the holders and presses them inwardly to the full line position, as shown in Fig. 8. The outward movement of the drawer, of course, moves the support 65 outwardly until the back of the holder rests in the carrier 48, the upturned edges of the carrier preventing the disengagement of the holder therefrom when the holder is closed and upheld by the support 65.

In the construction shown by Figs. 10 to 12, a lazy-tongs device 66 is provided at each side of the drawer and casing with a crosspiece 67 at the front of the drawer slidable in the slots 68 and with slotted holding brackets 69 at the rear of the cabinet. Each lower angular extremity of the lazy-tongs is provided with a roller 70, and every other pair of lower angular extremities has a cross shaft 71 with a carrier 72 supported thereby. Each of these carriers is adapted to support a holder represented generally by the numeral 73 with sides 74 each of which has a hook 75 adapted to engage over a projecting pivoting stud or bar 76 forming a cross-connection between the lazy-tongs at each side of the drawer. It will be obvious that the opening of the drawer will cause a corresponding opening of the holders contained therein the sides of which constitute filing dividers. It will be obvious, furthermore, that any one of the holders can be withdrawn from the drawer without affecting any of the other holders.

Instead of having a drawer, a plurality of holders may be supported in a container 77, as shown by Figs. 13 and 14, in which the top comprises two hinged covers 78 and 79 which overlap each other in closed position, but when opened abut the sides of the container so as to form side braces, as indicated by the broken outline in Fig. 14.

It is also contemplated that the sliding drawer construction as shown in Figs. 1 to 12, may include a roll-top cover 80, Figs. 15 and 16, which is attached to the front of the drawer at the bottom thereof, extending underneath the drawer and upwardly at the rear over the top where it is held in position by suitable guideway 81. With this construction it is apparent that the outward movement of the drawer will draw the bottom of the roll-top construction outwardly with it, making a space between the upper edge of the drawer and this edge of the roll-top, depending upon the amount that the drawer is pulled outwardly. This will enable one to entirely uncover all of the holders in the drawer when the drawer is drawn entirely from the cabinet.

It is further contemplated that the telescoping arrangement of the holders and support may be employed in connection with a telephone support type of lazy-tongs, as illustrated in Figs. 17 and 18. In this construction there is a bracket 82 fixed to any suitable support in which a plate 83 is pivoted upon an upright axis. The upper end of the plate has a slot 84 and a lazy-tongs 85 has one arm pivoted to the lower end of the plate and the other arm pivoted and slidable in the slot 84. At the outer end of the lazy-tongs is an end plate 86 with a handle 87 and with an upper slot 88 corresponding to the other slot 84. At each intermediate pivoting point of the arms of the lazy-tongs is a carrier 89 suspended therefrom by a strap 90, and either loosely supported thereby or pivoted directly upon the carrier are sides 91, forming a record holder, the sides telescoping one within the other when the device is closed. These sides 91 are supported at a distance from the carrier 89 by means of hooks 92 which engage with studs 93 projecting from the arms of the lazy-tongs. The outer ends 94 may be hinged to facilitate access thereto. It is obvious that when this construction is pulled outwardly from the support 82 by means of a handle 87, the opening of the lazy tongs will correspondingly open all of the holders, and that when the lazy-tongs is closed the holders will all be closed and pressed compactly against the plate 83. This construction is well adapted for use in connection with card indexes or other classified information which it is desirable to have within easy reach and to which reference can be made at any time.

As a means for filing classified sheets or records, individual holders can be used separately or they can be used in connection with a number of holders of the same kind in a suitable container. When any holder is withdrawn from the common container, as for example when posting entries on the sheets in a bookkeeping system, it is desirable that it be provided with means for supporting the sides of the holder in a partially open position so that access may be had to the sheets without any confusion, and although the holders have been illustrated diagrammatically in some of the figures, it should be understood that any preferred type of holder can be used in place of those conventionally shown.

It is furthermore obvious that other changes can be made in the construction, combination and arrangement of the parts without departing from the spirit and scope of my invention.

I claim:

1. In a filing device, a plurality of holders each comprising a back and hinged covers, a container therefor, and carriers in which the backs of the holders are seated, movable apart for opening the covers depending upon the movement of the carriers for disclosing the contents of the holders.

2. A filing device comprising a plurality of individual holders each having a back and covers hinged thereto, a carrier for supporting each holder upon its back with the covers extending upwardly therefrom, means for connecting the carriers for movement apart, and means depending upon the movement of the carriers for opening and closing the covers.

3. The combination with a plurality of holders each having a back and covers hinged thereto, of a container comprising a fixed and a movable part, a separate carrier for each holder, and a connection between the carriers and the fixed and movable parts of the container for spacing the carriers apart and correspondingly opening the covers according to the extent of movement of the movable part.

4. A filing device comprising a plurality of holders each having a back and hinged covers, a separate carrier for supporting each holder upon its back with the covers extending upwardly, extensible means for connecting the carriers for a limited movement apart, and means including a fixed and a movable part for determining the movement apart of said carriers and the extent of opening of said holders.

5. The combination with a plurality of holders having a back and hinged covers, of a container therefor, supports therein for the holders movable apart to determine the extent of opening of the holder covers, and a cover for the container movable to uncover the holders according to the extent of movement of said supports.

6. The combination with a plurality of connected holders each adapted to disclose records therein by moving it from the other holders, a container comprising a fixed and a movable part, and means connected to the fixed and movable parts of the container for supporting the holders and for opening the holders to disclose records therein according to the amount of the extension of the said movable parts.

7. The combination with a plurality of connected holders each adapted to be opened by moving it from the other holders, a container therefor comprising a fixed casing and a movable drawer, extensible means attached to the casing and drawer for supporting the holders and opening them according to the amount the drawer is pulled from the casing, and a cover connected to the bottom of the drawer and extending around the back and upwardly over the top thereof until it extends entirely over the drawer when it is closed but is opened from the front thereof according to the extent of opening of the drawer.

8. In a filing device, a plurality of holders, a container therefor comprising a fixed casing and a movable drawer, a guide in the sides of the casing above and around the back of the drawer, and a cover attached to the lower end of the drawer and extending in the guide until it abuts the top of the front of the drawer covering the drawer when it is closed but being drawn rearwardly when the drawer is opened to disclose the holders according to the amount the drawer is opened.

9. In a filing device, a plurality of movable holders, and means for connecting the holders for relative movement with respect to each other, said means limiting the movement apart of the holders but permitting independent movement thereof within the limit of movement.

EDWARD A. BANSCHBACH.